US008654743B1

(12) United States Patent
Li et al.

(10) Patent No.: US 8,654,743 B1
(45) Date of Patent: Feb. 18, 2014

(54) DEVICE AND METHOD FOR CONFIGURABLE TRANSMIT AND RECEIVE ANTENNAS

(75) Inventors: Jia-Ru Li, San Jose, CA (US); Yueh-Ju Lee, Saratoga, CA (US)

(73) Assignee: Lilee Systems, Ltd, Santa Clara, CA (US)

( * ) Notice: Subject to any disclaimer, the term of this patent is extended or adjusted under 35 U.S.C. 154(b) by 187 days.

(21) Appl. No.: 13/283,593

(22) Filed: Oct. 28, 2011

Related U.S. Application Data

(60) Provisional application No. 61/408,113, filed on Oct. 29, 2010.

(51) Int. Cl.
*H04W 4/00* (2009.01)

(52) U.S. Cl.
USPC .......................................... 370/334; 370/278

(58) Field of Classification Search
None
See application file for complete search history.

(56) References Cited

U.S. PATENT DOCUMENTS

| | | | | |
|---|---|---|---|---|
| 5,548,837 | A * | 8/1996 | Hess et al. | 455/278.1 |
| 5,777,530 | A * | 7/1998 | Nakatuka | 333/104 |
| RE37,375 | E * | 9/2001 | Satoh et al. | 333/193 |
| 6,754,584 | B2 * | 6/2004 | Pinto et al. | 701/470 |
| 6,826,391 | B2 * | 11/2004 | Leinonen et al. | 455/277.1 |
| 8,462,671 | B2 * | 6/2013 | Rinne et al. | 370/278 |
| 2006/0040618 | A1 * | 2/2006 | Braun et al. | 455/69 |

* cited by examiner

*Primary Examiner* — Robert Wilson
(74) *Attorney, Agent, or Firm* — Blairtech Solutions LLC

(57) ABSTRACT

A configurable antenna arrangement is disclosed for wireless Positive Train Control system to overcome the deep fading and fast fading issue. The radio channel between a locomotive on-board radio unit and a base station is subject to fast and deep fading. The channel changes rapidly in a short time comparing to the length of the packet. The invention uses a TX antenna and a RX antenna in a time division multiple access (TDMA) radio system associated with control circuits to provide a configurable antenna sub-system. The antenna sub-system is configurable to provide a TX mode, a primary RX mode and a secondary RX mode. In both the TX mode and the primary RX mode, there is substantially no insertion loss. In the secondary RX mode, the TX antenna is used as the secondary RX antenna to overcome fading caused by Doppler shift.

6 Claims, 3 Drawing Sheets

DEVICE AND METHOD FOR CONFIGURABLE TRANSMIT AND RECEIVE ANTENNAS

CROSS REFERENCE TO RELATED APPLICATIONS

The present invention claims priority to U.S. Provisional Patent Application, No. 61/408,113, filed Oct. 29, 2010, entitled "Device and Method for Configurable Transmit and Receive Antennas". The U.S. Provisional Patent Application is hereby incorporated by reference in its entireties.

FIELD OF THE INVENTION

The present invention relates to transmit and receive antennas for communication systems. In particular, this invention relates to configurable transmit and receive antennas to reduce the insertion loss for transmit path and/or receive path, to overcome fast fading problem associated with communication between a transmitter and a receiver having fast relative motion, and to improve reliability when either primary antenna is lost due to weather damage or vandalism.

BACKGROUND

In a wireless Positive Train Control (PTC) system, a fast-travelling locomotive communicates with a wayside or track-side base station through a radio link. A spectrum at 220 MHz has been allocated for the wireless PTC application to provide a reliable communication link between a locomotive and base stations. It is well known for digital radio systems that there are various channel impairments due to noise, multipath fading and the time-varying channel. A manifest of the net effects of the later two channel impairments is fast and deep fading, where the signal strength of received signal may be attenuated substantially in a very short period of time within the same packet. The attenuation may be more than 25 dB within 1 ms time during deep fading and the normal operation of the communication link may be temporarily interrupted.

In the PTC system, the weather damage and vandalism are the most frequent reasons that cause the service interruption since the antennas are usually installed outdoors. Often times, railroad uses dual antennas to overcome the performance problem by using an antenna splitter. Without careful impedance matching for cables, this mechanism usually causes serious performance degradation. The circuit block according to the present invention can optimize the system performance and provides matched impedance, maximizes the transmit power and receive sensitivity, and maintains the reliability of dual antenna systems against weather damage. With minimal cost added by the invented circuit, it allows to reuse existing dual antennas tower to achieve optimal performance.

There are several methods to overcome the fast fading issue. Block-based channel coding is one method that may be used to correct short burst errors associated with the fast fading. Nevertheless, the technique may require a block size sufficiently large to correct the burst errors and the large block size may not be desirable due to long latency and large memory required to store the block. Specifically, in a fast fading channel, smaller block size is highly preferable. On the other hand, multiple parallel receivers may also be used, where one receiver may be subject to deep fading at a time while the other one may still receive a good signal. However, the use of multiple parallel receivers will increase system cost. The circuit block incorporating an embodiment according to the present invention allows the receivers to use a secondary receive antenna when the primary antenna enters deep fade. In a time division multiple access (TDMA) channel, it is advantageous to configure the separate transmit and receive antennas as multiple receive antennas during the receiving period to overcome the fast fading problem.

BRIEF SUMMARY OF THE INVENTION

A configurable multiple antennas for a time division multiple access (TDMA) radio system between a base station and a locomotive are disclosed. The configurable multiple antennas comprise a first antenna, a second antenna, a first control circuit and a second control circuit. The first antenna is connected to a transmit signal port through a first electrical path, where the first electrical path has substantially zero loss. The second antenna is connected to a receive signal port through a second electrical path, where the second electrical path has substantially zero loss. The first control circuit is coupled between the first antenna and the receive signal port, where a first control signal is operable on the first control circuit to cause the first control circuit in an ON state or an OFF state. When the first control circuit is in the ON state, the first control circuit provides a third electrical path from the first antenna to the receive signal port. The second control circuit is coupled between the second antenna and a ground node, where a second control signal is operable on the second control circuit to cause the second control circuit in the ON state or the OFF state. When the second control circuit is in the ON state, the second antenna is grounded. The configurable multiple antennas can be configured to a selected antenna operation mode according to the first control signal and the second control signal. For example, if the selected antenna operation mode corresponds to a transmit mode, the first control signal and the second control signal can be configured to cause the first control circuit in the OFF state and the second control circuit in the ON state so that a transmit signal is fed from the transmit signal port to the first antenna through the first path and the second antenna is grounded. If the selected antenna operation mode corresponds to a primary received mode, the first control signal and the second control signal can be configured to cause the first control circuit in the OFF state and the second control circuit in the OFF state so that only the second antenna through the second path provides received signals to the receive signal port. If the selected antenna operation mode corresponds to a secondary receive mode, the first control signal and the second control signal can be configured to cause the first control circuit in the ON state and the second control circuit in the OFF state so that the first antenna through the third electrical path and the second antenna through the second electrical path both provide received signals to the receive signal port.

A method of configuring multiple antennas to a transmit mode, a primary receive mode or a secondary receive mode for a time division multiple access (TDMA) radio system between a base station and a locomotive is disclosed, where the multiple antennas comprises a first antenna connected to a transmit signal port through a first electrical path having substantially zero loss, a second antenna connected to a receive signal port through a second electrical path having substantially zero loss, a first control circuit coupled between the first antenna and the receive signal port, and a second control circuit coupled between the second antenna and a ground node. If the transmit mode is selected, the method applies a first control signal to the first control circuit to cause the first electrical control circuit in an OFF state and applies a second control signal to the second control circuit to cause the second electrical control circuit in an ON state so that a transmit signal is fed from the transmit signal port to the first antenna through the first path and the second antenna is grounded. If the primary receive mode is selected, the method applies the first control signal to the first control circuit to cause the first electrical control circuit in the OFF state and applies the second control signal to the second control circuit to cause the second electrical control circuit in the OFF state so that only the second antenna through the second electrical path provides received signals to the receive signal port. If the secondary receive mode is selected, the method applies the first control signal to the first control circuit to cause the first electrical control circuit in the ON state and applies the second control signal to the second control circuit to cause the second electrical control circuit in the OFF state so that the first antenna through the third electrical path and the second antenna through the second electrical path both provide the received signals to the receive signal port.

DETAILED DESCRIPTION OF THE INVENTION

Figure 1:
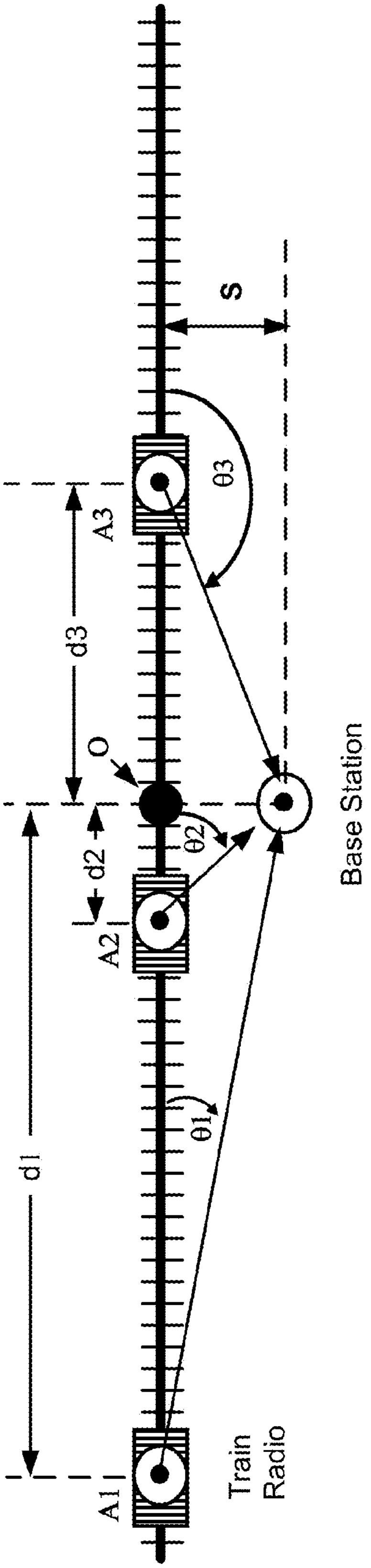
FIG. 1 illustrates a configuration of a moving locomotive and a track-side base station, where three different locomotive locations are shown.

In the Positive Train Control system, the fast moving train (e.g., The Acela Express by Amtrak travels at 165 MPH at northeast corridor) poses a great challenge to the system design since the channel characteristics change rapidly when the locomotive passes by the wayside base station, also called track-side base station or base station. FIG. 1 illustrates system configuration with a train radio and a track-side radio. The locomotive is travelling at a speed V and is shown at three difference track locations: A1, A2 and A3. The track-side base station is located at a distance S from the track and the track location corresponding to the base station is marked as O in FIG. 1. The distance between the locomotive and the base station is measured between the respective locomotive location and location O. For locations A1, A2 and A3, the respective distances are d1, d2 and d3 as shown in FIG. 1. The respective distances d1, d2 and d3 are referred to as principal distances in this disclosure. The Doppler frequency shift, also called Doppler shift in brief, is related to the relative velocity between a radio transmitter and a radio receiver. When the locomotive is far away from the base station, the angle between the line connecting the locomotive and the base station and the line coincided with the railroad track is very small. The relative speed in the direction from the locomotive to the base station is almost the same as the train speed. However, the relative speed in the direction from the locomotive to the base station becomes very different from the train speed when the locomotive approaches the base station.

Figure 2:
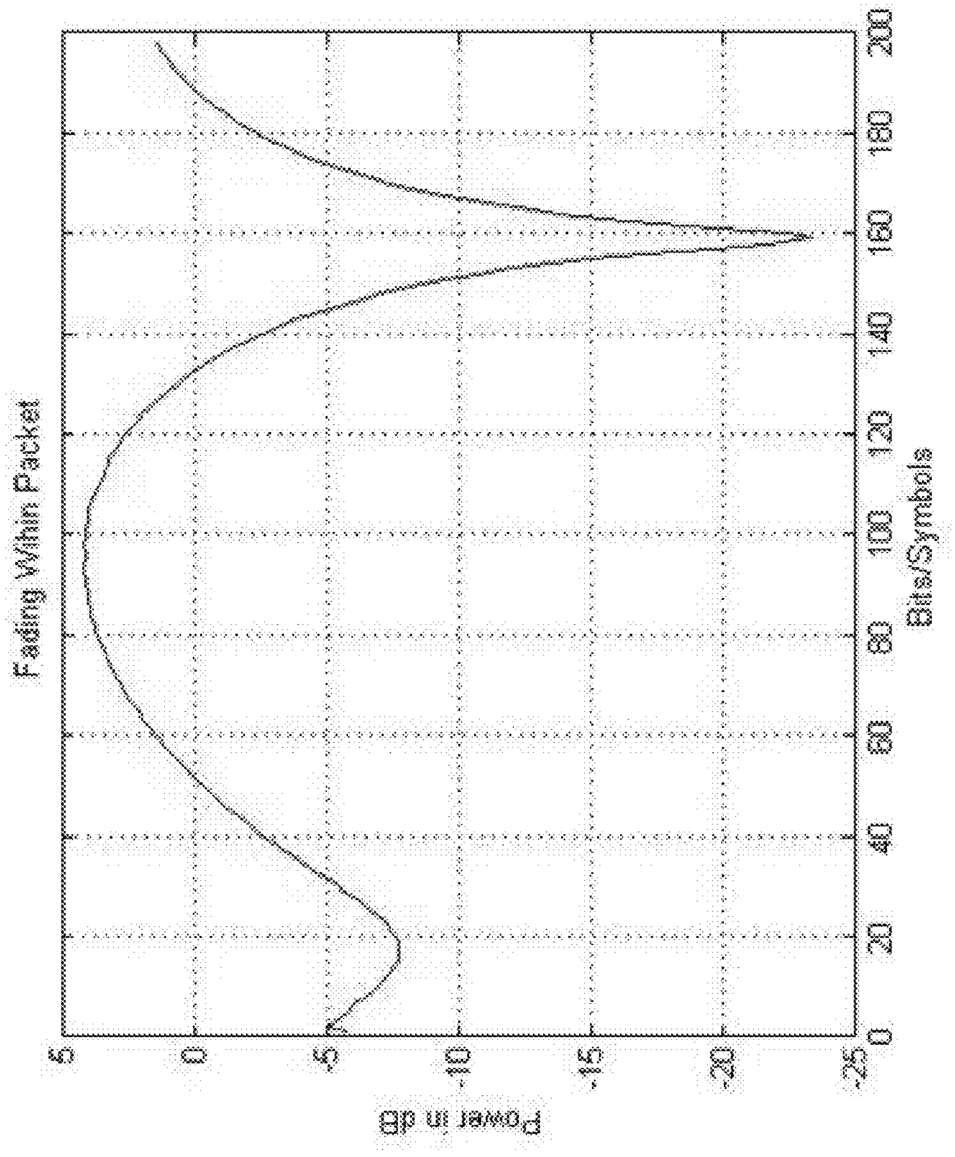
FIG. 2 illustrates exemplary signal strength versus the symbol time in a fast fading environment.

For the PTC system, frequency spectrum at 220 MHz is being allocated for this particular application. On the other hand, the train speed may reach as high as 500 km/h or more in the next 10 to 15 years. The combination of high carrier frequency and high speed will cause the channel impairment more prominent. FIG. 2 illustrates an example of receive signal strength in a fast fading environment, where the signal strength of received signal is attenuated substantially in a very short period. The attenuation may be more than 25 dB during deep fading which may temporarily interrupt the normal operation of the communication link. A robust digital communication system based on Orthogonal Frequency Division Multiplexing (OFDM) is being considered for the PTC system. In the OFDM system, the frequency band for a channel is divided into a large number of sub-bands and the digital data is transmitted using respective subcarriers. Therefore, instead of using a single high-rate bit stream as in a single carrier system, the OFDM system uses multiple subcarriers to carry a low rate data by each of the subcarriers. The low rate data corresponds to longer symbol period and results in a system more robust to inter-symbol interference caused by channel impairments. In FIG. 2, the horizontal axis corresponds to the symbol time. As shown in FIG. 2, multiple bits are impacted by the fast fading even if the data rate is substantially reduced using the OFDM technology. In a multiple carrier system such as OFDM, the deep fading would impact a much larger number of bits when a symbol is lost. The receive signal strength shown in FIG. 2 clearly suggests the need for other techniques to overcome the fast fading issue.

Antenna diversity is an effective way to overcome multi-path fading where one antenna may be receiving multi-path signals cancelling each other while the other antenna located at least a fractional wave-length away may be still receiving good signal. However, using multiple receive antenna will increase system cost. On the other hand, railroads usually deploy dual antennas to improve system availability because outdoor antennas are easy to be damaged by wind or vandalism. The additional cost of antenna to achieve reliability is acceptable by railroad. Therefore, the present invention uses existing dual antennas on the tower and adds minimal cost for the transmitter and receiver circuit to combat fast fading.

For PTC radio, time division duplex (TDD) is being considered for TX/RX duplex operation. Prior art usually requires a TX/RX switch circuit to combine the transmitting circuit and receiving circuit. The TX/RX switch usually has 1 to 3 dB of insertion loss. For RX, all prior arts reduce the receive sensitivity by 1 to 3 dB. This has dramatic impact on the receiver performance. Similarly, for TX, the use of TX/RX switch circuit in prior arts will reduce the output power by 1 to 3 dB. For a system with 30 Watts transmit power, a 3 dB loss due to the TX/RX switch would reduce the transmit power to 15 Watts, which is substantial. In comparison, the present invention has significant TX and RX performance improvement without expensive additional circuits. More importantly, the PTC radio usually have 50-125 Watts of the transmit power and there is no TX/RX switch device existing today that can handle sustained power more than 40 Watts.

Separate TX and RX antennas may be used for improved system performance while providing proper TX/RX isolation. During receiving, the TX antenna is not used. Therefore, it is possible to use the TX antenna as the secondary RX antenna during deep fading which will provide the benefit of antenna diversity without increasing the cost associated with the additional antenna. The present invention is related to antenna arrangement and control to allow the use of TX antenna as the secondary RX antenna while maintaining the high performance of dedicated TX and RX antennas during normal operation.

Figure 3:
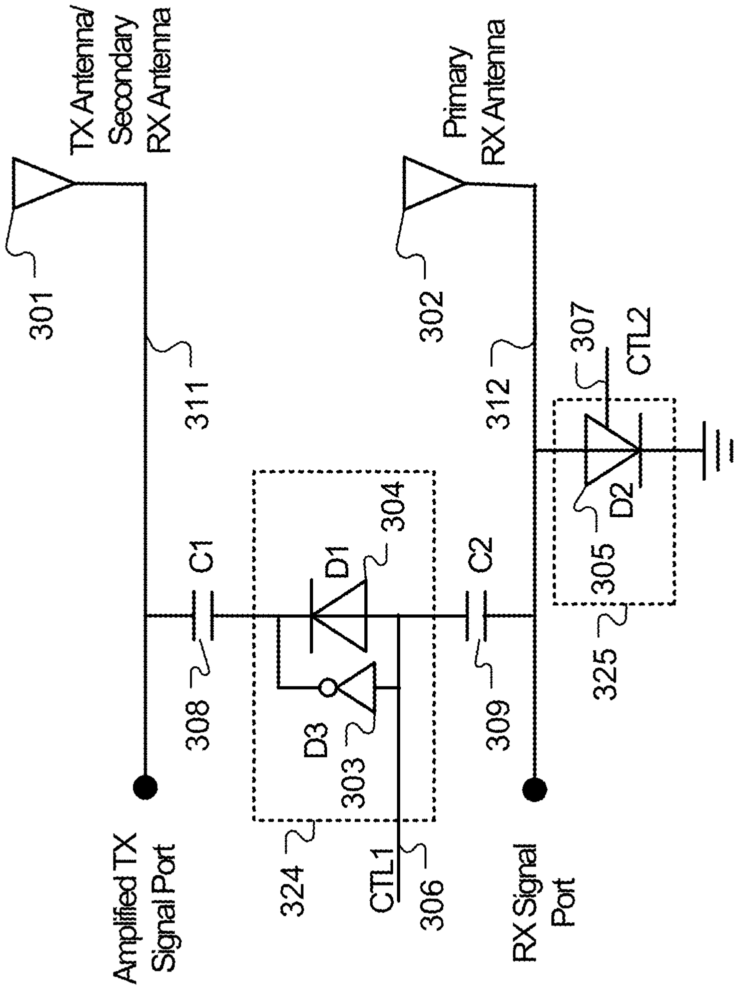
FIG. 3 illustrates an exemplary antenna arrangement incorporating an embodiment according to the present invention.

FIG. 3 illustrates an exemplary embodiment of antenna arrangement according to the present invention. The antenna sub-system comprises a TX antenna 301, a primary RX antenna 302, voltage controlled diode D1 304, and voltage controlled diode D2 305. The TX antenna 301 can also be configured as the secondary RX antenna. The voltage controlled diodes D1 304 and D2 305 can be implemented by diodes with bias control circuit such as a bias tee. A pair of DC blocking capacitors C1 308 and C2 309 is used across diode D1 304 to block the bias voltage CTL1 306 from coupling to the paths 311 and 312. Control signals CTL1 306 and CTL2 307 are used to control diode D1 304 and D2 305 respectively as shown in FIG. 3. An inverter D3 303 is used in parallel with diode D1 304 to provide the needed bias voltage for D1 304. When CTL1 is LOW, the D1 is reverse biased, therefore, the path 311 and 312 are isolated. While the CTL1 is HIGH, the high frequency received signal (such as 220 MHz in the PTC system) will pass from path 311 to path 312 through diode D1 304. The signal received at the secondary RX antenna will be routed to the RX signal port. In the TX mode, there is a direct path from the amplified TX signal port to the TX antenna so that the amplified TX signal can be radiated from the TX antenna without being attenuated by any signal routing elements such as switch and diode. (A voltage controlled diode in the transmit path may cause 1-3 dB insertion loss, which will reduce the transmission efficiency.) The amplified TX signal usually is amplified by a power amplifier or a combination of pre-amplifier and a power amplifier to boost the TX signal to a desired power level for transmission. The existence of any routing element from the amplified TX signal to the TX antenna will result in power dissipation by such routing element, which may cause a higher rate of component break down due to the large power dissipation. Therefore it is preferred not to use any routine element between the amplified TX signal port and the TX antenna. The antenna arrangement and control in FIG. 3 provides a direct path from the amplified TX signal to feed the TX antenna 301. During transmission, the diode D1 304 is biased to cause the diode in the OFF state and the diode D2 305 is biased to cause the diode in an ON state so as to ground the RX antenna. In TX antenna design, a matching circuit may be used for antenna impedance matching. A proper use of matching circuit will improve the system performance. The incorporation of matching circuit, such as capacitor(s) and/or inductor(s) with the TX antenna is considered as direct antenna connection as long as there is no routing element included in the path from the amplified TX signal port to the TX antenna.

On the other hand, the antenna arrangement and control circuit in FIG. 3 provide a direct path from the RX antenna 302 to the RX signal port. In normal reception, only the RX antenna 302 is used to receive the signal, where the diode D1 304 is biased to cause the diode in the OFF state and the diode D2 305 is biased to cause the diode in an OFF state. Therefore, the signal received by the RX antenna goes directly to the RX signal port without any routing element in between. The received signal level at the RX antenna usually is very small. The weak received signal will not be attenuated in the normal reception mode according to the embodiment illustrated in FIG. 3. In RX antenna design, a tuning/matching circuit may be used for antenna impedance matching or frequency tuning. A proper use of tuning/matching circuit will improve the system performance. Usually, only capacitor(s) and/or capacitor(s) of the matching/tuning circuit appear in the signal path. Therefore, the incorporation of tuning/matching circuit with the RX antenna is still considered as direct antenna connection as long as there is no routing element included in the path from the primary RX antenna to the RX signal input port. In typical systems, the received signal is subject to amplification using low-noise amplifier (LNA). The LNA and subsequent processing are not shown in FIG. 3.

FIG. 2 indicates that there will be instances that the received signal may be subject to deep fading. During deep fading, the receive signal strength may be substantially attenuated. An embodiment according to the present invention configures the TX/RX antennas as multiple RX antennas during deep fading. Accordingly, the diode D1 304 is biased to cause the diode in the ON state and the diode D2 305 is biased to the OFF state. The TX antenna 301 becomes a secondary RX antenna in this case. The received signal via the secondary antenna passes through C1 308, D1 304 and C2 309 to arrive at the RX signal port. The received signal by the secondary RX antenna 301 is subject to a small attenuation associated with the diode D1 304. Though the secondary RX path is subject to a small attenuation, the potential benefit of antenna space diversity during deep fading is much bigger and outweighs the small attenuation associated with the diode D1 304.

The control signal CTL1 306 will switch on the TX antenna as the secondary RX antenna only during deep fading and the control signal CTL1 306 can be derived from received signal. As suggested by FIG. 2, the received signal strength can be used to derive the needed control signal. For example, the received signal strength indicator (RSSI) can be measured and the measured RSSI level is compared with a threshold. When the RSSI level falls below a pre-defined threshold level in comparison with the initial preamble or training sequence, a control signal is generated to cause the diode D1 in the ON state. Otherwise the control signal will cause the diode D1 in the OFF state. The RSSI level measurement is well known in the field and will not be described here. While a pre-defined threshold can be used to determine whether the antenna subsystem should be configured as a single RX antenna or multiple RX antennas, the threshold may also be determined adaptively. For example, the threshold can be derived based on the average RSSI level over a period much longer than the period of deep fading. Furthermore, instead of using the RSSI level to determine the control signal CTL1 306, the change in RSSI level may also be used to determine the control signal CTL1 306.

The settings of the antenna sub-system for TX, primary RX antenna and secondary RX antenna configurations are summarized as follows:

| | TX | Primary RX Antenna | Secondary RX Antennas |
|---|---|---|---|
| D1 | OFF | OFF | ON |
| D2 | ON | OFF | OFF |

As described above, the antenna arrangement will deliver full power efficiency during transmission since no routing element is inserted in the transmission path from the amplified signal port to the TX antenna to cause any insertion loss. During normal reception, which represents most of the time that the system is operated, the system uses a primary RX antenna which is free from any insertion loss associated with the routing element. During deep fading, the system automatically detects the significant drop in receive signal strength level and switches to the secondary RX antenna mode. Antenna space diversity by using the TX antenna as the secondary RX antenna can greatly improve the poor reception during deep fading. The benefit of antenna diversity outweighs the small insertion loss in the path for the secondary RX antenna. The advantages of the configurable TX/RX antenna sub-system according to the present invention are substantial.

In the exemplary embodiment of the antenna sub-system shown in FIG. 3, the diode D1 304 and associated inverter D3 303 along with the control input CTL1 306 is considered as an example to implement a routing element 324. On the other hand, the diode D2 305 along with the control input CTL2 307 is considered as another example to implement a routing element 325. The routing element may be implemented using other circuit to provide the required characteristics. When a routing element is in the ON state, the routing element should be able to sustain large TX power in the ON state. However, a high-power signal switch device would be very expensive. The diode D1 304 only needs to handle low power since it is turned on to allow received signal (very low power) to pass. When the routing element is in the OFF state, it provides good isolation and is able to sustain high breakdown tolerance. In addition, the routing element has a short switching time between ON and OFF states so that proper system operation will not be inadvertently impacted. The routing element has sufficient frequency response and bandwidth to support the underlying communication system operation. When the routing element is in the OFF state, there is still a small amount of current flowing through the device. It is desirable for the routing element to have low leakage current.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A configurable multiple antennas for a time division multiple access (TDMA) radio system between a base station and a locomotive, the configurable multiple antennas comprising:

a first antenna connected to a transmit signal port through a first electrical path, wherein the first electrical path has substantially zero loss;

a second antenna connected to a receive signal port through a second electrical path, wherein the second electrical path has substantially zero loss;

a first control circuit coupled between the first antenna and the receive signal port, wherein a first control signal is operable on the first control circuit to cause the first control circuit in an ON state or an Off state, and wherein a third electrical path from the first antenna to the receive signal port is provided when the first control circuit is in the ON state; and a second control circuit coupled between the second antenna and a ground node, wherein a second control signal is operable on the second control circuit to cause the second control circuit in the ON state or the Off state, and wherein the second antenna is grounded when the second control circuit is in the ON state; and wherein the configurable multiple antennas are configured to a selected antenna operation mode according to the first control signal and the second control signal.

2. The configurable multiple antennas of claim 1, wherein the selected antenna operation mode corresponds to a secondary receive mode, wherein the first control signal and the second control signal are configured to cause the first control circuit in the ON state and the second control circuit in the OFF state so that the first antenna through the third electrical path and the second antenna through the second electrical path both provide received signals to the receive signal port.

3. The configurable multiple antennas of claim 1, wherein the selected antenna operation mode corresponds to a transmit mode, wherein the first control signal and the second control signal are configured to cause the first control circuit in the OFF state and the second control circuit in the ON state so that a transmit signal is fed from the transmit signal port to the first antenna through the first electrical path and the second antenna is grounded.

4. The configurable multiple antennas of claim 1, wherein the selected antenna operation mode corresponds to a primary received mode, wherein the first control signal and the second control signal are configured to cause the first control circuit in the OFF state and the second control circuit in the OFF state so that only the second antenna through the second electrical path provides received signals to the receive signal port.

5. A method of configuring multiple antennas to a transmit mode, a primary receive mode or a secondary receive mode for a time division multiple access (TDMA) radio system between a base station and a locomotive, wherein the multiple antennas comprises a first antenna connected to a transmit signal port through a first electrical path having substantially zero loss, a second antenna connected to a receive signal port through a second electrical path having substantially zero loss, a first control circuit coupled between the first antenna and the receive signal port, and a second control circuit coupled between the second antenna and a ground node, the method comprising:

if the transmit mode is selected, applying a first control signal to the first control circuit to cause the first electrical control circuit in an OFF state; and applying a second control signal to the second control circuit to cause the second electrical control circuit in an ON state so that a transmit signal is fed from the transmit signal port to the first antenna through the first electrical path having substantially zero loss and the second antenna is grounded;

if the primary receive mode is selected, applying the first control signal to the first control circuit to cause the first electrical control circuit in the OFF state; and applying the second control signal to the second control circuit to cause the second electrical control circuit in the OFF state so that only the second antenna through the second electrical path having substantially zero loss provides received signals to the receive signal port; and if the secondary receive mode is selected, applying the first control signal to the first control circuit to cause the first electrical control circuit in the ON state; and applying the second control signal to the second control circuit to cause the second electrical control circuit in the OFF state so that the first antenna through the third electrical path and the second antenna through the second electrical path both provide the received signals to the receive signal port.

6. The method of claim 5, wherein the first control signal is determined according to received signal strength indicator (RSSI) to select between the primary receive mode and the secondary receive mode.

* * * * *